United States Patent Office 3,471,459
Patented Oct. 7, 1969

3,471,459
ETHYLENE COPOLYMERS
George E. Waples, Jr., Lake Jackson, Tex., assignor to The Dow Chemical Company, Midland, Mich., a corporation of Delaware
No Drawing. Filed June 6, 1963, Ser. No. 285,880
Int. Cl. C08f 15/10
U.S. Cl. 260—88.1                             9 Claims

ABSTRACT OF THE DISCLOSURE

Copolymers of ethylene and a vinyl tertiary alcohol having both a hydroxyl group and a vinyl group bonded to the same carbon atom are prepared at elevated temperatures and pressures using free-radial catalysts. The products are suitable for films, coatings, mouldings, etc. having high impact strength and good water vapor barrier properties.

---

This invention relates to copolymers of ethylene and ethylenically unsaturated hydroxyl-containing monomers and to a process for preparing such compositions.

While hydrocarbon polymers such as polyethylene have found great usefulness in the plastics art, improvements in certain properties and combinations of properties would extend their usefulness even further. In the prior art some improvements in impact strength and flexibility have been obtained by copolymerizing monomers such as vinyl acetate with ethylene. However, even greater improvements in impact strength are desirable. Furthermore, while copolymerization of vinyl acetate, for example, did improve the impact strength and flexibility of the product compared to homopolymers of ethylene, other characteristics such as water barrier properties were deteriorated by such copolymerization. It would be desirable to have the combination of improved impact strength, improved flexibility and good vapor barrier properties in one product.

In it an object of this invention to provide new compositions of matter useful in the resin plastics art. A further object is to provide new thermoplastic polymers having desirable properties. A related object is to provide thermoplastic compositions which are useful in preparing coherent self-supporting films which have improved impact strength. A still further object is to provide polymers which have both improved impact strength and good vapor barrier properties. An additional object is to provide a process for preparing such compositions.

These and other objects are obtained by polymerizing ethylene and a vinyl tertiary alcohol having a hydroxyl group and a vinyl group bonded to the same carbon atom. Such vinyl tertiary alcohols have the formula:

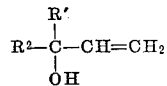

in which R' and R² each have at least one carbon atom and the sum of the number of carbon atoms in R' and R² desirably is not greater than 6. R' and R² may be linked to form a cyclic structure, e.g. as in 1-vinylcyclohexanol.

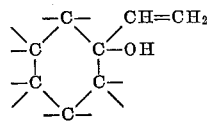

Representative vinyl tertiary alcohols which are used in the practice of this invention are 2-methyl-3-buten-2-ol, 3-methyl-1-penten-3-ol, 3-ethyl-1-penten-3-ol, 3-methyl-1-hexen-3-ol, 3-ethyl-1-hexen-3-ol, 3-n-propyl-1-hexen-3-ol, 3-isopropyl-1-hexen-3-ol, 3-methyl-1-hepten-3-ol, 3-ethyl-1-hepten-3-ol, 3,5-dimethyl-1-hexen-3-ol, 2,2,3-trimethyl-4-penten-3-ol, 3-ethyl-5-methyl-1-hexan-3-ol, 3-ethyl-2,2-dimethyl-4-penten-3-ol, 1-vinylcyclohexanol, and the like.

Such vinyl tertiary alcohols are obtained, for example, by the partial hydrogenation of the corresponding acetylenic alcohols as described in U.S. Letters Patent 2,883,431.

The copolymers of this invention are prepared from mixtures of ethylene and the above-described vinyl alcohols by polymerization either in tubular or stirred autoclave reactors at pressures from about 10,000 to about 35,000 pounds per square inch or higher, and at temperatures from about 100° C. to about 300° C., preferably from about 150° C. to about 260° C. using, at catalytically effective concentration, polymerization catalysts such as peroxygen-type catalysts or other free-radical producing materials such as the azo catalysts or others well known in the art. Examples of the peroxygen-type catalysts are diethyl peroxide, hydrogen peroxide, di-tertiary butyl peroxide, persuccinic acid, lauroyl hydroperoxide, tetrahydronaphthalene peroxide, alkali metal, alkaline earth metal or ammonium persulfates, perborates, percarbonates, and the like. Such catalysts usually are used in the range from about 0.01 percent to about 1 percent, based on the weight of the monomers. Other methods of catalysis; such as irradiation by ultraviolet, X-ray and gamma rays as well as by radiation from radioactive materials and high energy electrons generated from linear accelerators, resonant transformers, and the like; may be used if desired. The term "under the influence of free-radical producing means" is defined to include free-radical producing materials as defined above in contact (e.g., either as solid particles or in solution) with the polymerizable monomer mixture and to irradiation as herein described, which produce free-radicals in effective concentration within the polymerization zone.

The upper limit of pressure is determined by the mechanical strength of the reactor and the pumps. Higher pressure effects higher molecular weights and higher conversions. The polymerization is carried out either in the presence or absence of water and/or inert solvents.

The ethylene copolymers of this invention desirably contain from about 1 to about 30 percent, preferably from about 3 percent to about 16 percent, of the vinyl tertiary alcohol based on the total copolymer weight. The balance of the copolymer composition; i.e., from about 70 to about 99 percent, preferably from about 84 to about 97 percent; usually is ethylene. However, if desired, there may be substituted for a portion of the ethylene small proportions, i.e. up to about 2 percent, of other ethylenically unsaturated hydrocarbons. Also, chain transfer agents having no ethylenic unsaturation, such as acetone, methanol, propanol, and the like, may be used in minor amounts if desired.

Optionally, other polymers and copolymers, e.g. high pressure polyethylene, low pressure polyethylene, polypropylene, and ethylene-propylene copolymers, can be blended with the ethylene copolymers heretofore described.

Likewise, small amounts of conventional additives and modifiers useful in the resin plastics art, such as antioxidants, stabilizers, antistatic agents, antiblocking agents, slip agents, carbon black, pigments, colorants, and the like, can be blended with the copolymers of this invention.

The following examples illustrate more fully, to those skilled in the art, the practice of this invention but are not to be construed as limiting the scope thereof.

Example 1

Ethylene at the rate of 37.5 pounds per hour, 2-methyl-3-buten-2-ol (hereafter called methyl butenol) at the rate of 1.04 pounds per hour and the catalyst, lauroyl peroxide, at the rate of 0.0082 pound per hour (as a 2 percent solution in a mixed solvent consisting of equal quantities by volume of benzene and hexane) were introduced into a stirred autoclave reactor. The temperature was maintained at 209° C. and the pressure at 18,000 pounds per square inch. A white solid product was isolated with a total conversion of 6.85 percent of the feed. This product had the following properties as determined by standard methods defined hereinafter.

| | |
|---|---|
| Melt index | 1.32 |
| Tensile strength p.s.i | 1840 |
| Yield strength p.s.i | 1360 |
| Elongation percent | 510 |
| Density | 0.9190 |
| Rigidity p.s.i | $1.7 \times 10^4$ |
| Methyl butenol in product weight percent | 5.97 |

Examples 2–8

Other copolymers were prepared in the same equipment and by a similar procedure to that described in Example 1. The changes in polymerization conditions including feed composition and feed rates are shown in Table 1 as well as the properties of the copolymer products obtained thereby.

TABLE I

| Polymerization | Example No. | | | | | | |
|---|---|---|---|---|---|---|---|
| | 2 | 3 | 4 | 5 | 6 | 7 | 8 |
| Temperature, °C | 207 | 204 | 200 | 207 | 205 | 205 | 202 |
| Pressure, p.s.i | 16,000 | 18,000 | 21,000 | 21,000 | 21,000 | 21,000 | 21,000 |
| Ethylene flow rate, lb./hr | 37.5 | 35.0 | 36.3 | 36.3 | 50.0 | 49.0 | 50.0 |
| Methyl butenol in feed, percent [1] | 4.58 | 7.4 | 10.3 | 7.88 | 13.4 | 12.0 | 11.9 |
| Methyl butenol in product, percent [1] | 9.03 | 10.91 | 13.8 | 14.5 | [2] 11.3 | 9.6 | 11.7 |
| Lb. of catalyst/lb. of product | .0066 | .0050 | .0026 | .0046 | .0046 | .0035 | .0035 |
| Total conversion rate, percent of feed | 4.95 | 6.35 | 10.3 | 10.9 | 9.75 | 12.5 | 11.2 |
| Product properties: | | | | | | | |
| Melt index | 2.16 | 19.0 | 48.8 | 486 | 0.56 | 4.1 | 1.1 |
| Setting up grade | 1.28 | 17.3 | ([3]) | ([3]) | ([3]) | ([3]) | ([3]) |
| Tensile strength, p.s.i | 1,895 | 1,595 | 1,245 | 880 | 2,485 | 2,250 | 2,535 |
| Yield strength, p.s.i | 1,315 | 1,140 | 945 | 890 | 1,205 | 1,120 | 1,205 |
| Elongation, percent | 545 | 585 | 480 | 485 | 595 | 650 | 640 |
| Rigidity (×10⁻⁴), p.s.i | 1.4 | 1.0 | 0.78 | 0.75 | 1.1 | 0.99 | 1.1 |
| Density | .9188 | .9169 | ([3]) | ([3]) | ([3]) | .9160 | .9165 |

[1] 2-methyl-3-buten-2-ol.
[2] Infra red analysis.
[3] Not determined.

Films were fabricated from the copolymer products of Examples 7 and 8 by extrusion through a 1.5 inch tubing extruder and blowing in a conventional blown-film technique while the extruder die was maintained at 160° C. to provide films of about 1½ mil thickness.

Other films were prepared in the same manner from copolymers of ethylene with vinyl acetate or with isobutyl acrylate for comparison with the products of this invention. The results of impact strength and specific moisture vapor permeability tests are shown in Table II below.

TABLE II

| Monomer copolymerized with ethylene | | Melt index | Dart impact, g. | SMVP [1] (mg.) (mm.)/cm.² in 24 hrs. |
|---|---|---|---|---|
| Kind | Percent | | | |
| Methyl butenol [2] | 9.6 | 4.1 | 400 | 0.0287 |
| Do [2] | 11.7 | 1.1 | 483 | 0.0295 |
| Vinyl acetate [3] | 10.3 | 2.0 | 265 | ([4]) |
| Do [3] | 12.0 | 2.0 | ([4]) | 0.0524 |
| Isobutyl acrylate [3] | 14.4 | 1.9 | ([4]) | 0.0624 |

[1] Specific moisture vapor permeability.
[2] 2-methyl-3-buten-2-ol.
[3] Not products of this invention.
[4] Not determined.

Other vinyl tertiary alcohols; e.g., 3-methyl-1-hexen-3-ol, c-methyl-1-penten-3-ol, 3-n-propyl-1-hexen-3-ol, 3-ethyl-1-hepten-3-ol, 2,2,3-trimethyl-4-penten-3-ol, 3-ethyl-2,2-dimethyl-4-penten-3-ol, and 1-vinylcyclohexanol; may be substituted for the 2-methyl-3-buten-2-ol of the above examples with substantially the same results.

For comparison with the data of Table I and Table II, a homopolymer of ethylene prepared under conditions such as to provide a product having a Melt Index of 2.0±0.2 has representative properties shown below as determined by the methods hereinafter described.

| | |
|---|---|
| Tensile strength p.s.i | 1563 |
| Yield strength p.s.i | 1602 |
| Elongation percent | 455 |
| Rigidity p.s.i | $2.6 \times 10^4$ |
| Dart impact grams | 138 |
| Specific moisture vapor permeability mg.-mm./cm.² | 0.0224 |

From the above examples and tests it can be seen that the films of copolymers of this invention, as concerns impact strength, are greatly improved compared to polyethylene and considerably improved when compared to prior art copolymers. Furthermore, the water vapor barrier characteristics of films from the products of the invention, as shown by the specific moisture vapor permeability, are of about the same excellent magnitude as polyethylene but are greatly improved as indicated by direct comparison with prior art ethylene copolymers with vinyl acetate or with isobutyl acrylate. Thus, in the products of this invention, are combined excellent impact strength and excellent water vapor barrier properties as well as the other good properties listed in Table I.

The methods used to evaluate the properties of the polymer products and of the films obtained therefrom were as follows:

Melt index.—The melt index was determined by the method of ASTM D1238-52T.

Setting up grade.—The setting up grade was determined by heating a portion of the material for 48 hours at 100° C. then determining the rate of extrusion in grams per ten minutes in the same manner as for the melt index determination.

Density.—The density, more precisely called specific gravity, was determined by the method of ASTM D792-50, modified for liquid temperature of 25±0.2° C. rather than 23±0.1° C.

Tensile strength.— The tensile strength was determined according to the method of ASTM D638-58T modified to the extent that the results are calculated on the average of 4 specimens of a thickness of 140±10 mils and the specimens were conditioned by (1) submerging the specimens in boiling distilled water for 10 minutes, (2) keeping them in air at 50±5% relative humidity at 73.4±1° F. for at least 15 minutes.

Yield strength.—The yield strength was determined from specimens prepared as for the Tensile Strength Test and is defined as the tension (in lb.) at the yield point (as described in item 24 of the Appendix of D638-58T per square inch of cross-sectional area of the specimen.

Percentage elongation.—Percentage elongation (at break) was determined as a percentage of the original gauge length from specimens conditioned as described above.

Rigidity.—Rigidity, or stiffness in flexure, was determined by the method of ASTM D747-58T.

Dart impact. The dart impact strength was measured in a manner similar to ASTM D1709-59T. A modified dart having a length of 6.5 inches rather than 4.5 inches and a weight of 55 grams rather than 32 grams was dropped from a height of 26.5 inches rather than 26 inches: incremental weights of 20 grams were used. Calculations were made by the alternate graphic method, as described in ASTM D1709-59T.

Specific moisture vapor permeability.—The specific moisture vapor permeability was determined by modifications of ASTM E96-53T "Test for Water Vapor Transmission". In the modified test method, Procedure B of ASTM E96-53T is followed except for the changes shown below: Instead of using distilled water in the test dishes there is substituted about 5 cc. of a standard salt solution prepared by dissolving 50 grams of CP sodium chloride in water and diluting to 1000 cc. Instead of using a test cabinet maintained at 50 percent relative humidity the test dishes with specimen attached are placed in a desiccator in which the desiccant is silica gel which has been heated at 300° F. for 24 hours then cooled. The water vapor transmission is calculated according to the graphical method described for the ASTM test than the specific moisture vapor permeability (SMVP) is calculated according to the definition:

SMVP is the number of milligrams of water which permeates through 1 sq. cm. of film, 1 mm. thick, in 24 hours (mg.$\times$mm./cm.$^2$ in 24 hours).

Methyl butenol in product.—The methyl butenol which was polymerized in the product was determined by direct oxygen analysis by the volumetric method substantially as described in Al Steyermark, "Quantitative Organic Microanalysis," Academic Press, New York, 2nd edition, 1961, pages 396–404. Confirmation of the presence of polymerized methyl butenol in the product was obtained by infrared determination.

The compositions of this invention provide advantageous self-supporting films, molded articles and coatings such as for wires and cables.

What is claimed is:

1. A film forming copolymer of (a) ethylene and (b) a monoethylenically unsaturated monohydroxy tertiary alcohol having the hydroxy group and a vinyl group attached to the same carbon atom; said alcohol having from 5 to 9 carbon atoms; and said copolymer containing the tertiary alcohol in copolymerized form in an amount from about 1 percent to about 30 percent of the total copolymer weight.

2. The copolymer of claim 1 in which the vinyl tertiary alcohol is 2-methyl-3-buten-2-ol.

3. The copolymer of claim 1 in which the vinyl tertiary alcohol is present in copolymerized form in an amount from about 3 percent to about 16 percent by weight of the total copolymer weight.

4. A coherent self-supporting film comprising a copolymer of (a) ethylene and (b) a monoethylenically unsaturated monohydroxy tertiary alcohol having the hydroxy group and a vinyl group attached to the same carbon atom; said alcohol having from 5 to 9 carbon atoms; and said copolymer containing the tertiary alcohol in copolymerized form in an amount from about 1 percent to about 30 percent of the total copolymer weight.

5. The film of claim 4 in which the vinyl tertiary alcohol which is polymerized to prepare the copolymer is 2-methyl-3-buten-2-ol.

6. The film of claim 4 in which the vinyl tertiary alcohol is present in copolymerized form in an amount from about 3 percent to about 16 percent by weight of the total copolymer weight.

7. A process for producing a homogeneous copolymer of ethylene and from about 1 percent to about 30 percent by weight, based on the total weight of the copolymer, of a vinyl tertiary alcohol comprising heating at a temperature of from about 130° C. to about 300° C. under a pressure from about 10,000 to about 35,000 pounds per square inch and under the influence of free-radical producing means a monomer mixture comprising (a) ethylene
(b) a monoethylenically unsaturated monohydroxy tertiary alcohol having the hydroxyl group and a vinyl group attached to the same carbon atom; said alcohol having from 5 to 9 carbon atoms.

8. The process of claim 7 in which the vinyl tertiary alcohol is 2-methyl-3-buten-2-ol.

9. The process of claim 7 in which the amount of the vinyl tertiary alcohol is from about 3 percent to about 16 percent by weight based on the total copolymer weight.

References Cited

UNITED STATES PATENTS

| | | | |
|---|---|---|---|
| 2,987,556 | 6/1961 | Brill | 260—88.1 |
| 3,313,789 | 4/1967 | Naarmann | 260—80.5 |

JOSEPH L. SCHOFER, Primary Examiner

J. C. HAIGHT, Assistant Examiner

U.S. Cl. X.R.

260—80.75, 80.78